United States Patent
Mamada et al.

(10) Patent No.: US 8,593,700 B2
(45) Date of Patent: Nov. 26, 2013

(54) ERECTING EQUAL-MAGNIFICATION LENS ARRAY PLATE, OPTICAL SCANNING UNIT, AND IMAGE READING DEVICE

(75) Inventors: Haruhiko Mamada, Minato-ku (JP); Katsuhide Shimmo, Minato-ku (JP); Teruhide Inoue, Minato-ku (JP)

(73) Assignee: Nippon Sheet Glass Co., Ltd., Tokyo (JP)

( * ) Notice: Subject to any disclaimer, the term of this patent is extended or adjusted under 35 U.S.C. 154(b) by 462 days.

(21) Appl. No.: 12/859,633

(22) Filed: Aug. 19, 2010

(65) Prior Publication Data

US 2011/0043872 A1   Feb. 24, 2011

(30) Foreign Application Priority Data

Aug. 20, 2009   (JP) .................................. 2009-191365

(51) Int. Cl.
  *H04N 1/46* (2006.01)
  *H04N 1/04* (2006.01)
(52) U.S. Cl.
  USPC ............................ 358/474; 358/513; 358/514
(58) Field of Classification Search
  USPC ......... 358/474, 505, 509, 513, 514, 473, 475, 358/480, 482, 484; 250/559.05, 559.06
  See application file for complete search history.

(56) References Cited

U.S. PATENT DOCUMENTS

| | | | |
|---|---|---|---|
| 5,146,529 A * | 9/1992 | Mizutani | 385/103 |
| 6,906,858 B2 * | 6/2005 | Karaki et al. | 359/383 |
| 7,420,659 B1 * | 9/2008 | Cabuz et al. | 356/39 |
| 7,896,524 B2 * | 3/2011 | Yoneda et al. | 362/282 |
| 2007/0086191 A1 * | 4/2007 | Choi et al. | 362/268 |
| 2009/0177432 A1 * | 7/2009 | Taylor et al. | 702/134 |
| 2010/0038559 A1 * | 2/2010 | Feke et al. | 250/458.1 |
| 2010/0128353 A1 * | 5/2010 | Nagata et al. | 359/619 |
| 2012/0170072 A1 * | 7/2012 | Miyazaki et al. | 358/1.13 |

FOREIGN PATENT DOCUMENTS

| | | |
|---|---|---|
| JP | 2006-003522 A | 1/2006 |
| JP | 2009-069801 A | 4/2009 |
| WO | 2007/040246 A1 | 4/2007 |

OTHER PUBLICATIONS

Japanese Office Action dated Mar. 26, 2013 issued in Japanese Patent Application No. 2009-191365.
Japanese Office Action dated Sep. 9, 2013, issued in Japanese Patent Application No. 2009-191365 (with translation).

* cited by examiner

*Primary Examiner* — Jerome Grant, II
(74) *Attorney, Agent, or Firm* — Sughrue Mion, PLLC

(57) ABSTRACT

An erecting equal-magnification lens array plate includes a stack of a first lens array plate provided with a plurality of first lenses arranged on a first surface and a plurality of second lenses arranged on a second surface, and a second lens array plate provided with a plurality of third lenses arranged on a third surface and a plurality of fourth lenses arranged on a fourth surface. The erecting equal-magnification lens array plate is provided with a first light shielding wall provided upright to surround the first lens, and a second light shielding wall provided upright to surround the fourth lens. An area on the first surface of the first lens array plate outside the effective region of the first lenses is roughened.

5 Claims, 3 Drawing Sheets

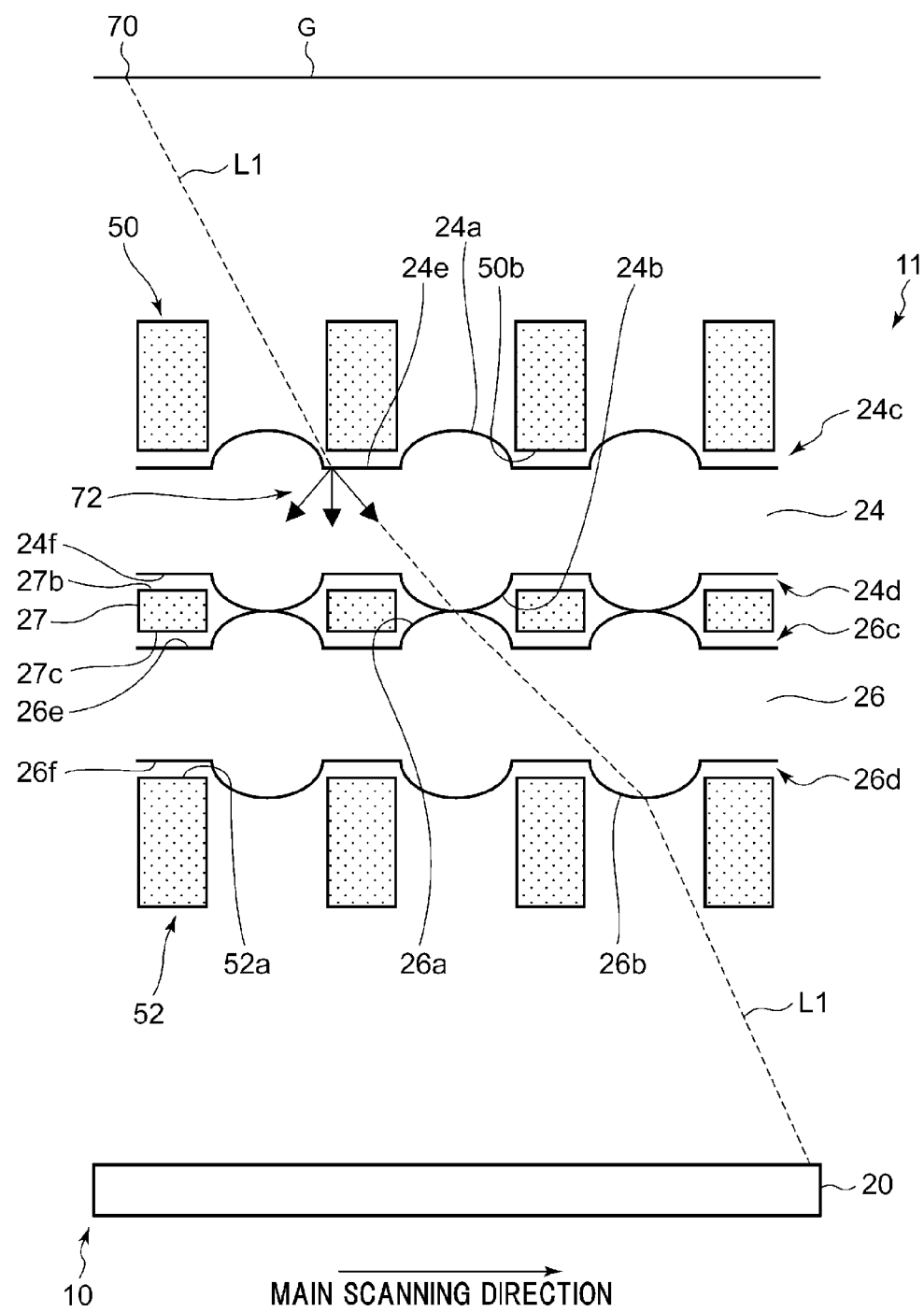

ERECTING EQUAL-MAGNIFICATION LENS ARRAY PLATE, OPTICAL SCANNING UNIT, AND IMAGE READING DEVICE

BACKGROUND OF THE INVENTION

1. Field of the Invention

The present invention relates to erecting equal-magnification lens array plates used in image reading devices and to optical scanning units and image reading devices using the erecting equal-magnification lens array plate.

2. Description of the Related Art

Some image reading devices such as scanners are known to use erecting equal-magnification optics. Erecting equal-magnification optics are capable of reducing the size of devices better than reduction optics. In the case of image reading devices, an erecting equal-magnification optical system comprises a line light source, an erecting equal-magnification lens array, and a line image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of columns of rod lenses, the proportion of light transmitted is improved and unevenness in the amount of light transmitted is reduced. Due to price concerns, it is common to use one or two columns of rod lenses in a rod lens array.

Meanwhile, an erecting equal-magnification lens array plate could be formed as a stack of a plurality of transparent lens array plates built such that the optical axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of columns can be manufactured at a relatively low cost.

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating noise (also referred to as ghost noise) as it leaves the plate.

Some devices are known to address stray light, which does not contribute to imaging, by forming a light shielding wall on an erecting equal-magnification lens array plate or providing a light shielding member between erecting equal-magnification lens array plates (see patent document No. 1).

[patent document No. 1] JP 2009-069801

However, due to an error in manufacturing members of an erecting equal-magnification lens array plate or an error in assembling the members, light may reach a portion that is not expected to receive light according to the design, and the light reflected or refracted at that portion may cause flare noise. In the presence of flare noise, white flare occurs across an image, resulting in poor S/N ratio.

SUMMARY OF THE INVENTION

The present invention addresses the issue and a purpose thereof is to provide an erecting equal-magnification lens array plate capable of reducing flare noise, and an optical scanning unit and an image reading device using the erecting equal-magnification lens array plate.

An erecting equal-magnification lens array plate addressing the issue comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface, a first light shielding wall provided upright on the first surface to surround the first lens; a second light shielding wall provided upright on the fourth surface to surround the fourth lens, and the first lens array plate and the second lens array plate form a stack such that the second surface and the third surface face each other to ensure that a combination of the lenses associated with each other form a coaxial lens system, and such that the erecting equal-magnification lens array plate receives light from a line light source facing the first surface and forms an erect equal-magnification image of the line light source on an image plane facing the fourth surface. At least one of an area on the first surface outside the effective region of the first lenses, an area on the second surface outside the effective region of the second lenses, an area on the third surface outside the effective region of the third lenses, an area on the fourth surface outside the effective region of the fourth lenses, an area of the first light shielding wall facing the first surface, and an area of the second light shielding wall facing the fourth surface is roughened. Preferably, at least an area of the first light shielding wall facing the first surface is roughened.

While the light reflected or refracted at the areas as defined above and incident on an imaging plane may cause flare noise, the embodiment above allows flare noise to be reduced because the light incident on those of the areas that are roughened is scattered.

The erecting equal-magnification lens array plate may further comprise: a light shielding member provided between the first lens array plate and the second lens array plate and provided with a plurality of apertures corresponding to the second lenses and the third lenses. At least one of an area of the light shielding member facing the second surface and an area thereof facing the third surface may be roughened. In this case, flare noise is further reduced.

The roughening process may be such that the center-line average surface roughness Ra is 0.2-2 μm, both inclusive. By performing such a roughening process, flare noise is suitably reduced.

Another embodiment of the present invention relates to an optical scanning unit. The optical scanning unit comprises: a line light source configured to illuminate an image to be read; the erecting equal-magnification lens array plate adapted to condense light reflected from the image to be read; and a line image sensor adapted to receive the light transmitted by the erecting equal-magnification lens array plate.

Since the aforementioned erecting equal-magnification lens array plate is used to form the optical scanning unit according to this embodiment, the line image sensor can receive an erect equal-magnification image with reduced flare noise.

Another embodiment of the present invention relates to an image reading device. The image reading device comprises: the optical scanning unit; and an image processing unit adapted to process an image signal detected by the optical scanning unit.

Since the aforementioned optical scanning unit is used to form the image reading device, high-quality image data in which flare noise is suitably removed can be generated.

Optional combinations of the aforementioned constituting elements, and implementations of the invention in the form of methods, apparatuses, and systems may also be practiced as additional modes of the present invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which:

FIG. 3 shows the operation of the erecting equal-magnification lens array plate according to the embodiment.

DETAILED DESCRIPTION OF THE INVENTION

The invention will now be described by reference to the preferred embodiments. This does not intend to limit the scope of the present invention, but to exemplify the invention.

Figure 1:
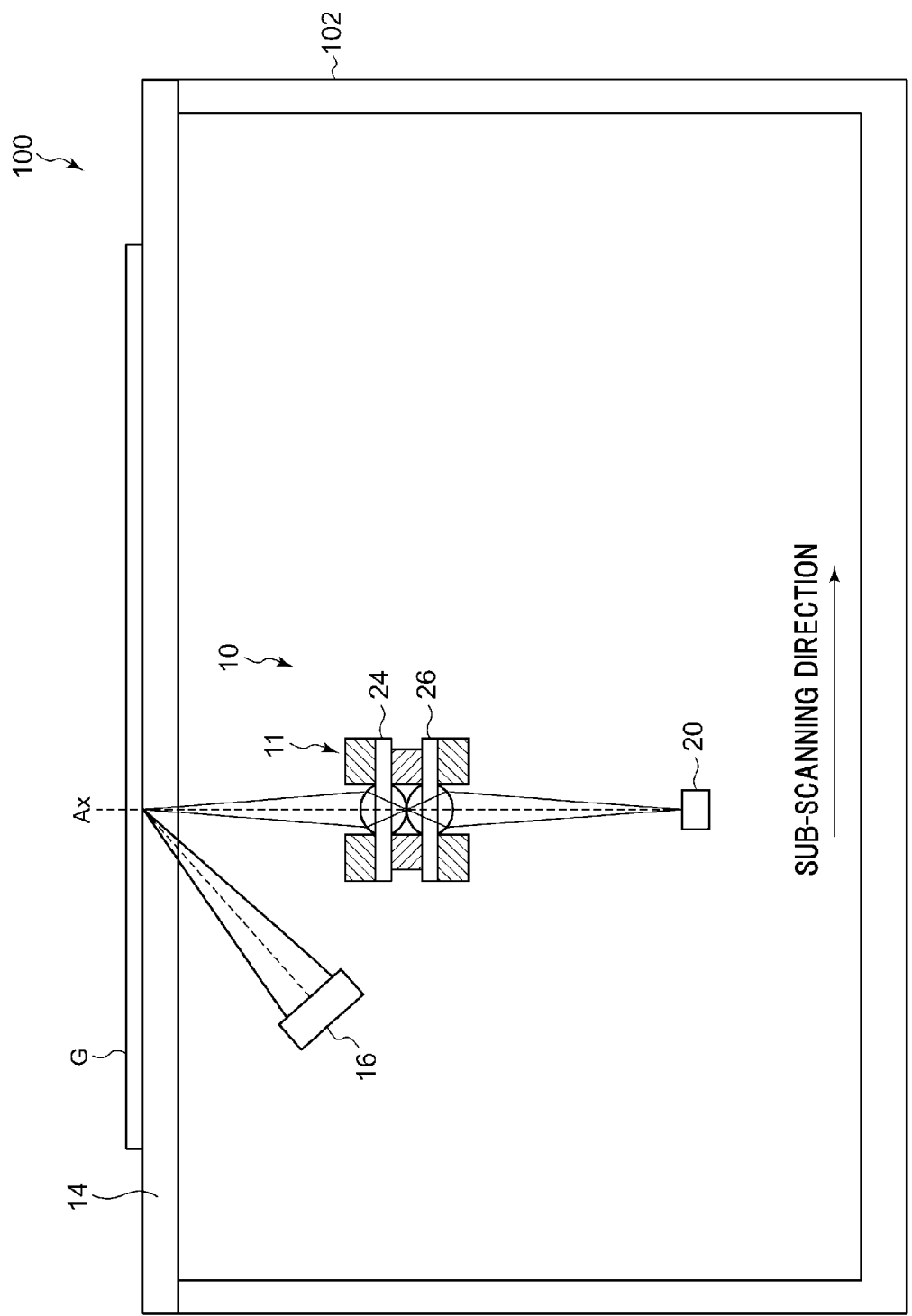
FIG. 1 shows an image reading device according to an embodiment of the present invention.

FIG. 1 shows an image reading device 100 according to an embodiment of the present invention. As shown in FIG. 1, the image reading device 100 comprises a case 102, a glass plate 14 on which a document G is placed, an optical scanning unit 10 accommodated in the case 102, a driving mechanism (not shown) for driving the optical scanning unit 10, and an image processing unit (not shown) for processing data read by the optical scanning unit 10.

The optical scanning unit 10 comprises a line light source 16 for illuminating a document G placed on a glass plate 14, an erecting equal-magnification lens array plate 11 for condensing light reflected from the document G, a line image sensor (photoelectric transducer) 20 for receiving light condensed by the erecting equal-magnification lens array plate 11, and a housing (not shown) for fixing the line light source 16, the erecting equal-magnification lens array plate 11, and the line image sensor 20.

The line light source 16 is a light source emitting a substantially straight light. The light source 16 is secured such that the optical axis of the illuminating light passes through the intersection of the optical axis Ax of the erecting equal-magnification lens array plate 11 and the top surface of the glass plate 14. The light exiting the line light source 16 illuminates the document G placed on the glass plate 14. The light illuminating the document G is reflected by the document G toward the erecting equal-magnification lens array plate 11. The area on the document G reflecting the light can be considered as a light source emitting line light toward the erecting equal-magnification lens array plate 11.

As described below, the erecting equal-magnification lens array plate 11 comprises a stack of a first lens array plate 24 and a second lens array plate 26 built such that pairs of corresponding lenses form a coaxial lens system, where each lens array plate is formed with a plurality of lenses on both surfaces of the plate. The first lens array plate 24 and the second lens array plate 26 are held by a holder (not shown) in a stacked state. The erecting equal-magnification lens array plate 11 is installed in the image reading device 100 such that the longitudinal direction thereof is aligned with the main scanning direction and the lateral direction thereof is aligned with the sub-scanning direction.

The erecting equal-magnification lens array plate 11 is configured to receive line light reflected from the document G located above and form an erect equal-magnification image on an image plane located below, i.e., a light-receiving surface of the line image sensor 20. The image reading device 100 can read the document G by scanning document G with the optical scanning unit 10 in the sub-scanning direction.

Figure 2:
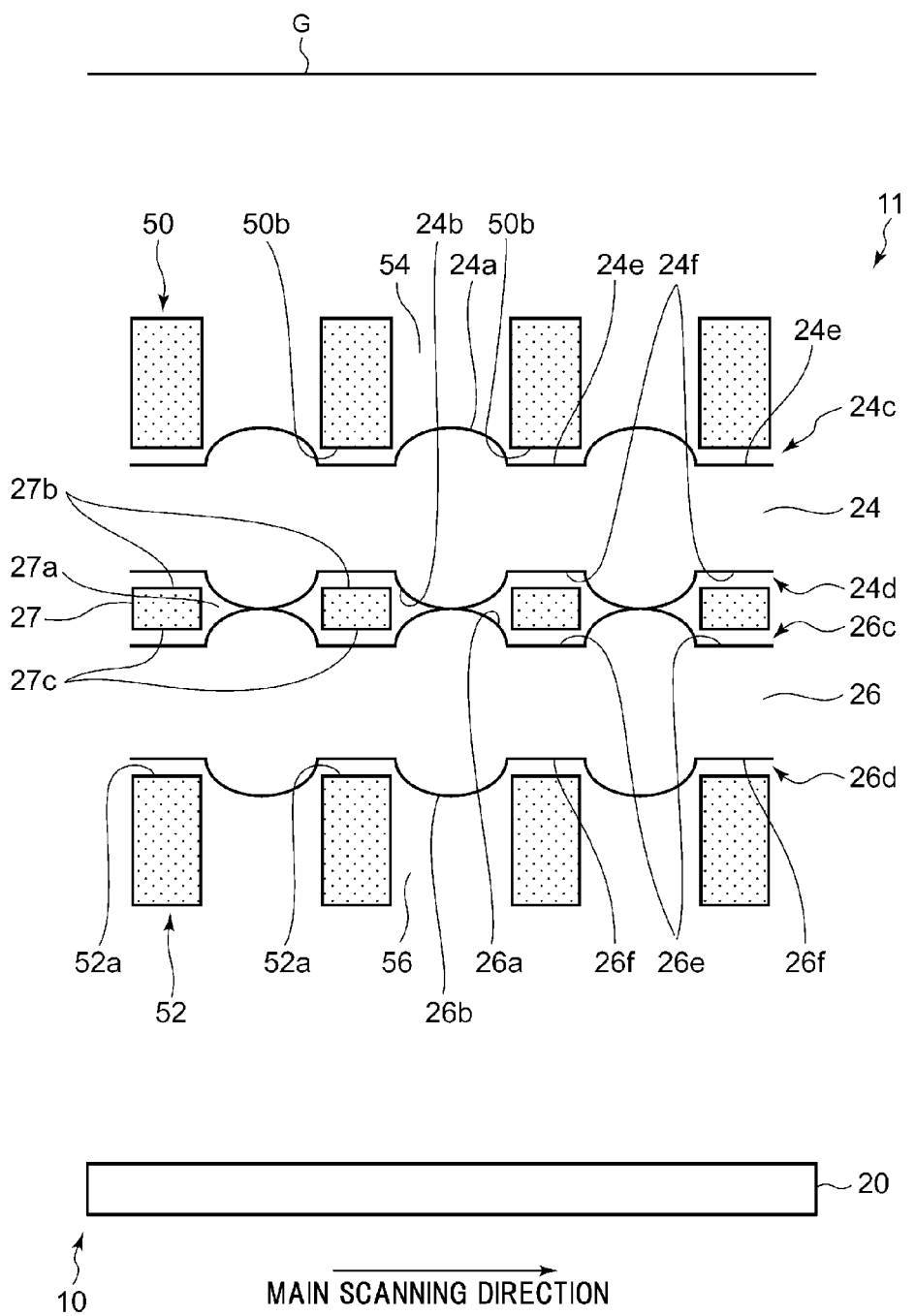
FIG. 2 is a sectional view of a part of the optical scanning unit taken in the main scanning direction.

FIG. 2 is a sectional view of a part of the optical scanning unit 10. Referring to FIG. 2, the horizontal direction in the illustration represents the main scanning direction (longitudinal direction) of the erecting equal-magnification lens array plate 11 and the depth direction in the illustration represents the sub-scanning direction (lateral direction).

As described above, the erecting equal-magnification lens array plate 11 comprises a stack of the first lens array plate 24 and the second lens array plate 26. Each of the first lens array plate 24 and the second lens array plate 26 is a rectangular plate and is provided with an arrangement of a plurality of convex lenses on both sides thereof.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorption property. Desired materials include cycloolefin resins, olefin resins, norbornene resins, and polycarbonates.

A plurality of first lenses 24a are arranged in a single line on a first surface 24c (one of the surfaces of the first lens array plate 24) in the longitudinal direction of the first lens array plate 24. A plurality of second lenses 24b are arranged in a single line on a second surface 24d, which is opposite to the first surface 24c, in the longitudinal direction of the first lens array plate 24.

A plurality of third lenses 26a are arranged in a single line on a third surface 26c (one of the surfaces of the second lens array plate 26) in the longitudinal direction of the second lens array plate 26. A plurality of fourth lenses 26b are arranged in a single line on a fourth surface 26d, which is opposite to the third surface 26c, in the longitudinal direction of the second lens array plate 26.

In this embodiment, it is assumed that the first lens 24a, the second lens 24b, the third lens 26a, and the fourth lens 26b are spherical in shape. Alternatively, the lenses may have aspherical shapes.

The first lens array plate 24 and the second lens array plate 26 form a stack such that the second surface 24d and the third surface 26c face each other to ensure that a combination of the first lens 24a, second lens 24b, third lens 26a, and fourth lens 26b associated with each other form a coaxial lens system. While it is assumed in this embodiment that the second lens 24b on the second surface 24d and the third lens 26a on the third surface 26c are in contact with each other, the second lens 24b and the third lens 26a may be at a distance from each other.

A first light shielding wall 50 is provided upright on the first surface 24c of the first lens array plate 24 so as to surround the first lenses 24a. A first aperture 54 is defined by the first light shielding wall 50 above each of the first lenses 24a. The first aperture 54 is cylindrical in shape and is provided such that the central axis thereof is aligned with the optical axis of the first lens 24a. The first light shielding wall 50 functions to shield stray light from being incident on the first lens 24a so as to reduce ghost noise. The height of the first light shielding wall 50 is set to remove light entering at an angle larger than a predetermined maximum angle of view.

Similarly, a second light shielding wall 52 is provided upright on the fourth surface 26d of the second lens array plate 26 so as to surround each of the fourth lenses 26b. A second aperture 56 is defined by the second light shielding wall 52 above each of the fourth lenses 26b. The second aperture 56 is cylindrical in shape and is provided such that the central axis thereof is aligned with the optical axis of the fourth lens 26b. The second light shielding wall 52 functions to remove stray light exiting the fourth lens 26b so as to reduce ghost noise. The height of the second light shielding wall 52 is configured to be identical to that of the first light shielding wall 50.

The first light shielding wall 50 and the second light shielding wall 52 may be formed by, for example, injection molding using a light absorbing material such as black ABS resin. The first light shielding wall 50 and the second light shielding wall 52 may be formed by coating the first surface 24c and the fourth surface 26d with a stack of black resin paint.

A light shielding member 27 is provided between the first lens array plate 24 and the second lens array plate 26. A plurality of apertures 27a corresponding to the second lenses 24b and the third lenses 26a are formed in the light shielding member 27. In each aperture 27a, the corresponding second lens 24b and third lens 26a are laid in. The light shielding member 27 functions to shield stray light not contributing to imaging so as to reduce ghost noise. The light shielding member 27 is formed by providing an aperture 27a in a film member having low optical transmittance. Desired materials of the light shielding member 27 include black cycloolefin resins, olefin resins, and norbornene resins.

In this embodiment, an area 24e on the first surface 24c of the first lens array plate 24 outside the effective region of the first lenses 24a, and an area 24f on the second surface 24d outside the effective region of the second lenses 24b are roughened. Further, an area 26e on the third surface 26c of the second lens array plate 26 outside the effective region of the third lenses 26a, and an area 26f on the fourth surface 26d outside the effective region of the fourth lenses 26b are roughened. The term "effective region of a lens" refers to a portion having the function of a lens.

In this embodiment, an area 50b of the first light shielding wall 50 facing the first surface 24c is roughened. The area 50b of the first light shielding wall 50 covers the area 24e on the first surface 24c of the first lens array plate 24. FIG. 2 shows that a gap is created between the area 50b and the area 24e but the area 50b and the area 24e may be in contact with each other. An area 52a of the second light shielding wall 52 facing the fourth surface 26d is also roughened. The area 52a of the second light shielding wall 52 covers the area 26f of the fourth surface 26d of the second lens array plate 26. FIG. 2 shows that a gap is created between the area 52a and the area 26f but the area 52a and the area 26f may be in contact with each other.

Further, in this embodiment, an area 27b of the light shielding member 27 facing the second surface 24d, and an area 27c of the light shielding member 27 facing the third surface 26c are also roughened. The area 27b of the light shielding member 27 covers the area 24f on the second surface 24d of the first lens array plate 24, and the area 27c of the light shielding member 27 covers the area 26e of the third surface 26c of the second lens array plate 26. FIG. 2 shows that a gap is created between the area 27b and the area 24f and between the area 27c and the area 26e, but the area 27b and the area 24f may be in contact with each other and the area 27c and the area 26e may be in contact with each other.

The areas 24e, 24f, 26e, 26f, 50b, 52a, 27b, and 27c may roughened by forming a roughened portion in the mold used in injection molding for forming the lens array plates, the light shielding wall, and the light shielding member. Alternatively, the surface may be roughened by blasting or etching the injection-molded product.

The erecting equal-magnification lens array plate 11 as configured above is built in the image reading device 100 shown in FIG. 1 such that the distance from the first lens 24a to the document G and the distance from the fourth lens 26b to the line image sensor 20 are equal to a predetermined working distance.

FIG. 3 shows the operation of the erecting equal-magnification lens array plate 11 according to the embodiment of the present invention.

A case is postulated where the first light shielding wall 50 is arranged on the first lens array plate 24, displaced from the designed position, due to an error in manufacturing the first light shielding wall 50 or the first lens array plate 24 or due to an error in assembling the first light shielding wall 50 to the first lens array plate 24.

As shown in FIG. 3, light L1 (broken line) emitted from a point 70 on the document G and about to be incident on the erecting equal-magnification lens array plate 11 at a large angle of incidence will be discussed. The light L1 is absorbed by the first light shielding wall 50 if the first light shielding wall 50 is arranged on the first lens array plate 24 as designed. However, since the first light shielding wall 50 is displaced, the light is not absorbed by the first light shielding wall 50 and is incident on the area 24e on the first surface 24c of the first lens array plate 24. The light L1 incident on the area 24e is transmitted through the second lens 24b, the third lens 26a, and the fourth lens 26b before being incident on the line image sensor 20, causing flare noise. If the area 24e on the first surface 24c is not roughened, most of the light L1 incident on the area 24e contributes to generation of flare noise.

Since the area 24e on the first surface 24c of the erecting equal-magnification lens array plate 11 according to this embodiment is roughened, the light L1 is scattered by the area 24e as indicated by an arrow 72 of FIG. 3. Accordingly, the amount of light L1 reaching the line image sensor 20 is reduced and so the flare noise is reduced.

The area 24e on the first surface 24c is an area where light is not expected to be incident on because it would be covered by the area 50b of the first light shielding wall 50 if the first light shielding wall 50 is arranged as designed. As described above, light could be incident on an area where light is not normally expected to be incident on, due to an error in manufacturing a member or an error in building an assembly. By roughening the area as taught in this embodiment, however, flare noise is reduced.

While the discussion above concerns scattering of light incident on the area 24e on the first surface 24c, incident light is scattered in other roughened areas as well so that flare noise is reduced. While all of the areas 24e, 24f, 26e, 26f, 50b, 52a, 27b, and 27c of the erecting equal-magnification lens array plate 11 according to this embodiment are roughened, flare noise is advantageously reduced if at least one of the areas is roughened.

Of the plurality of areas listed above, the area 50b of the first light shielding wall 50 facing the first surface 24c and the area 27c of the light shielding member 27 facing the third surface 26c are not located in the direction of travel of imaging light and so are not areas of concern in the related art as a cause of flare noise. However, we made an intensive study on reduction of flare noise and found out that areas not located in the direction of travel of imaging light, such as the areas noted above, could cause flare noise due to multiple reflection, etc. We have come to realize flare noise can be reduced by roughening areas such as the area 50b and the area 27c that are not located in the direction of travel of imaging light.

Desirably, the areas 24e, 24f, 26e, 26f, 50b, 52a, 27b, and 27c are roughened such that the center-line average surface roughness Ra is 0.2-2 μm, both inclusive. Still desirably, these areas are roughened such that the center-line average surface roughness Ra is 0.6-2 μm, both inclusive. By roughening the areas as described above, flare noise is suitably reduced. The desirable range of the center-line average surface roughness Ra is experimentally determined by us.

The result of comparison between an erecting equal-magnification lens array plate subjected to roughening process and an erecting equal-magnification lens array plate not subjected to roughening process will be shown below. In the following examples, the center-line average surface roughness Ra of the roughening process is 0.6 μm.

We experimentally roughened the area 50b of the first light shielding wall 50 facing the first surface 24c and the area 52a of the second light shielding wall 52 facing the fourth surface 26d and found out that flare noise is reduced by about 30% in comparison with an erecting equal-magnification lens array plate not subjected to roughening process. Flare noise is reduced by about 10% by roughening only the area 50b. The experimental result shows that flare noise is reduced by roughening the area 50b not located in the direction of travel of imaging light.

Further, we experimentally roughened the area 27b of the light shielding member 27 facing the second surface 24d and the area 27c of the light shielding member 27 facing the third surface 26c and found out that flare noise is reduced by about 10% in comparison with an erecting equal-magnification lens array plate not subjected to roughening process. Flare noise is reduced by about 2% by roughening only the area 27c. The experimental result shows that flare noise is reduced by roughening the area 27c not located in the direction of travel of imaging light.

Further, we experimentally roughened the area 24f on the second surface 24d outside the effective region of the second lenses 24b and the area 26e on the third surface 26c outside the effective region of the third lenses 26a and found out that flare noise is reduced by about 30% in comparison with an erecting equal-magnification lens array plate not subjected to roughening process.

Further, we experimentally roughened the interior wall of the first aperture 54 and the second aperture 56 in addition to the roughening process on the area 50b and the area 52a, flare noise can be reduced by about 50% in comparison with an erecting equal-magnification lens array plate not subjected to roughening process. The experimental result shows that flare noise can be further reduced by additionally roughening the interior wall of the first aperture 54 and the second aperture 56.

Described above is an explanation based on an exemplary embodiment. The embodiment is intended to be illustrative only and it will be obvious to those skilled in the art that various modifications to constituting elements and processes could be developed and that such modifications are also within the scope of the present invention.

In the embodiment described, lenses on the respective lens surfaces are arranged in a single row in the main scanning direction. Alternatively, lenses may be arranged in two rows in the main scanning direction or arranged in a square array.

What is claimed is:

1. An erecting equal-magnification lens array plate comprising:
   a first lens array plate provided with a plurality of first lenses systematically arranged on a first surface and a plurality of second lenses systematically arranged on a second surface opposite to the first surface;
   a second lens array plate provided with a plurality of third lenses systematically arranged on a third surface and a plurality of fourth lenses systematically arranged on a fourth surface opposite to the third surface;
   a first light shielding wall provided upright on the first surface to surround each of the first lenses;
   a second light shielding wall provided upright on the fourth surface to surround each of the fourth lenses; and
   a light shielding member provided between the first lens array plate and the second lens array plate and provided with a plurality of apertures corresponding to the second lenses and the third lenses,
   wherein the first lens array plate and the second lens array plate form a stack such that the second surface and the third surface face each other to ensure that a combination of the lenses associated with each other form a coaxial lens system, and such that the erecting equal-magnification lens array plate receives light from a line light source facing the first surface and forms an erect equal-magnification image of the line light source on an image plane facing the fourth surface,
   wherein at least one of an area outside a portion having the function of lenses on the first surface, an area outside a portion having the function of lenses on the second surface, an area outside a portion having the function of lenses on the third surface, an area outside a portion having the function of lenses on the fourth surface, an area of the first light shielding wall facing the first surface, and an area of the second light shielding wall facing the fourth surface is roughened, and
   wherein at least one of an area of the light shielding member facing the second surface and an area thereof facing the third surface is roughened.

2. The erecting equal-magnification lens array plate according to claim 1,
   wherein at least an area of the first light shielding wall facing the first surface is roughened.

3. The erecting equal-magnification lens array plate according to claim 1,
   the roughening process is such that the center-line average surface roughness Ra is 0.2-2 μm, both inclusive.

4. An optical scanning unit comprising:
   a line light source configured to illuminate an image to be read;
   an erecting equal-magnification lens array plate adapted to condense light reflected from the image to be read, said erecting equal-magnification lens array plate comprising:
   a first lens array plate provided with a plurality of first lenses systematically arranged on a first surface and a plurality of second lenses systematically arranged on a second surface opposite to the first surface;
   a second lens array plate provided with a plurality of third lenses systematically arranged on a third surface and a plurality of fourth lenses systematically arranged on a fourth surface opposite to the third surface;
   a first light shielding wall provided upright on the first surface to surround each of the first lenses;
   a second light shielding wall provided upright on the fourth surface to surround each of the fourth lenses; and
   a light shielding member provided between the first lens array plate and the second lens array plate and provided with a plurality of apertures corresponding to the second lenses and the third lenses,
   wherein the first lens array plate and the second lens array plate form a stack such that the second surface and the third surface face each other to ensure that a combination of the lenses associated with each other form a coaxial lens system, and such that the erecting equal-magnification lens array plate receives light from a line light source facing the first surface and forms an erect equal-magnification image of the line light source on an image plane facing the fourth surface, wherein at least one of an area outside a portion having the function of lens on the first surface, an area outside a portion having the function of lens on the second surface, an area outside a portion having the function of lens on the third surface, an area outside a portion having the function of lens on the fourth surface, an area of the first light shielding wall facing the first surface, and an area of the second light shielding wall facing the fourth surface is roughened, and wherein at least one of an area of the light shielding member facing the second surface and an area thereof facing the third surface is roughened; and a line image sensor adapted to receive the light transmitted by the erecting equal-magnification lens array plate.

5. An image reading device comprising:

the optical scanning unit according to claim 4; and an image processing unit adapted to process an image signal detected by the optical scanning unit.

* * * * *